United States Patent [19]

Vorres

[11] 4,416,857
[45] Nov. 22, 1983

[54] FLUIDIZED BED GASIFIER OR SIMILAR DEVICE FOR SIMULTANEOUS CLASSIFICATION OF ASH AND UNREACTED COAL

[75] Inventor: Karl S. Vorres, Western Springs, Ill.

[73] Assignee: Institute of Gas Technology, Chicago, Ill.

[21] Appl. No.: 408,226

[22] Filed: Aug. 16, 1982

Related U.S. Application Data

[63] Continuation-in-part of Ser. No. 288,158, Jul. 29, 1981, Pat. No. 4,369,045.

[51] Int. Cl.³ .......................... C10J 3/56; F27B 15/00
[52] U.S. Cl. .................................. 422/145; 34/57 A; 418/63; 418/77; 209/138
[58] Field of Search ................ 422/145; 34/57; 48/63, 48/64, 77, 87, 62 R; 209/138, 139 R, 149

[56] References Cited

U.S. PATENT DOCUMENTS 2,856,264 10/1958 Dunn .................................. 34/57 A
4,057,402 11/1977 Patel et al. ............................ 48/206
4,153,558 5/1979 Frykhult ............................ 209/144

Primary Examiner—Peter F. Kratz
Attorney, Agent, or Firm—Allegretti, Newitt, Witcoff & McAndrews, Ltd.

[57] ABSTRACT

An apparatus for withdrawing agglomerated solids, e.g. ash, from a fluidized bed of finely divided solid hydrocarbonaceous material, e.g. coal, is described. Agglomeration is effected by a high temperature reaction between the inorganic constituents of the hydrocarbonaceous material in the fluidized bed environment. A venturi is utilized to serve as a passage for withdrawing the agglomerated solids from the fluidized bed. Spiral or other descending ridges are positioned on the interior surface of the constricted cylindrical opening of the venturi. A tube, through which reaction gases pass, is centrally disposed within the constricted cylindrical opening to permit variable and increased rates of agglomerate discharge with improved separation and classification of the solid materials.

8 Claims, 14 Drawing Figures

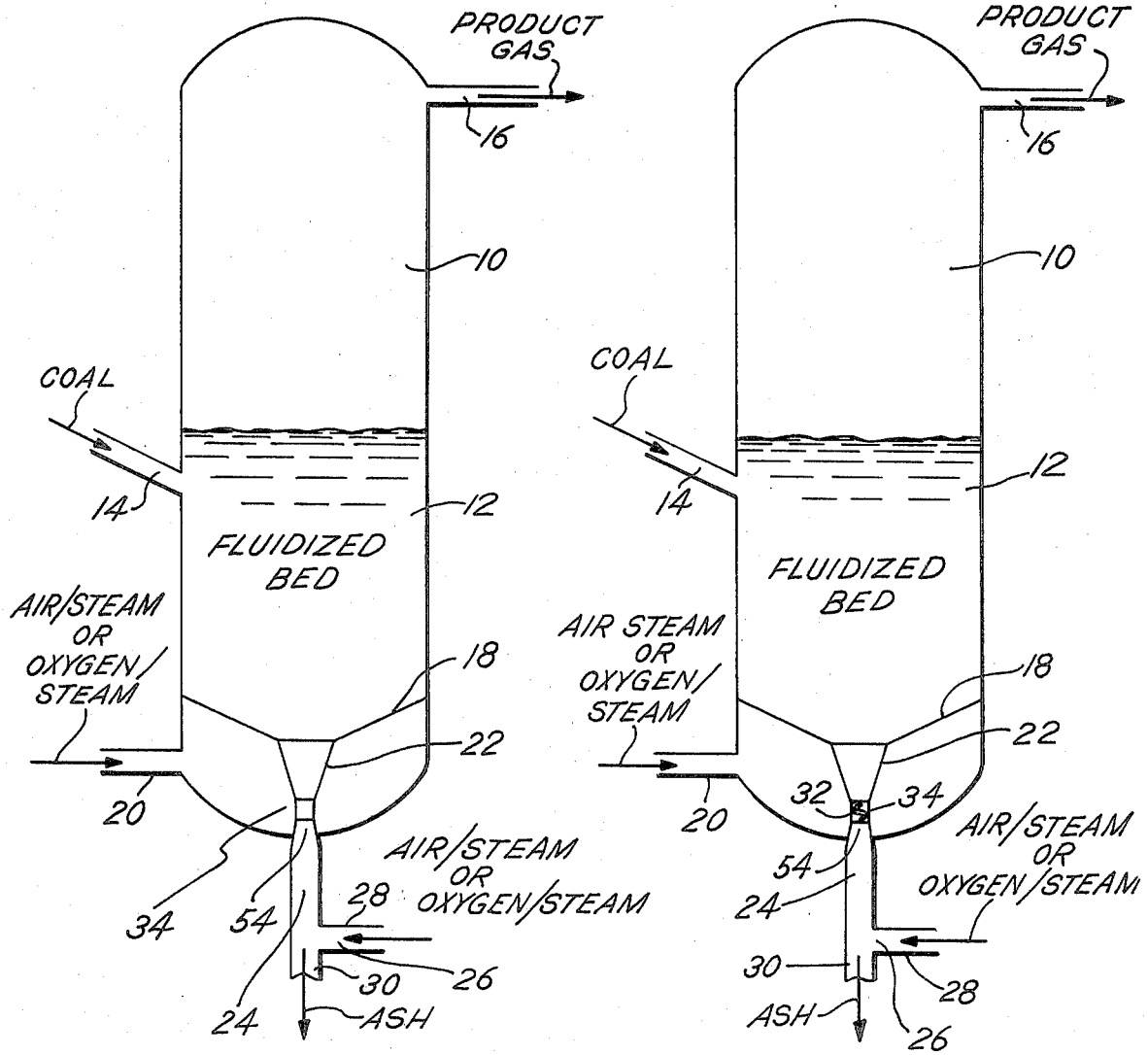
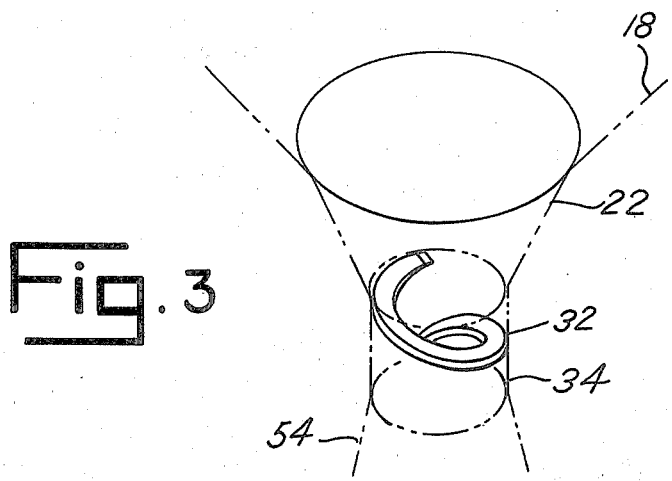

AIR/STEAM
OR
OXYGEN/STEAM

AIR/STEAM
OR
OXYGEN/STEAM

GAS FLOW INCLUDING ENTRAINED CHAR PARTICLES

FLUIDIZED BED GASIFIER OR SIMILAR DEVICE FOR SIMULTANEOUS CLASSIFICATION OF ASH AND UNREACTED COAL

CROSS REFERENCE TO RELATED APPLICATION

This application is a continuation-in-part application of application Ser. No. 288,158, filed in the U.S. Patent and Trademark Office on July 29, 1981, now U.S. Pat. No 4,369,045, the teachings of which are incorporated by reference herein.

BACKGROUND OF THE INVENTION

This invention relates to an improved apparatus and process for withdrawing agglomerated solids from a fluidized bed of finely divided solid hydrocarbonaceous material and more particularly, to an apparatus and process wherein the agglomeration is effected by a high temperature reaction between the inorganic constituents of the hydrocarbonaceous material in the fluidized bed environment.

A coal gasification reactor wherein agglomerated coal ash is withdrawn from a fluidized reaction bed of finely divided coal without the removal of the finely divided coal particles is described in Jequier et al, U.S. Pat. No. 2,906,608, the teachings of which are incorporated by reference herein. In a coal to gas conversion process of the type described in Jequier et al, a vessel is provided to contain a fluidized bed. A gas distribution grid is usually positioned in the bottom of the vessel to define the bottom surface of the fluidized bed. The central portion of the grid may be conical or cylindrical in shape and comprises a downwardly extending passage. At the bottom of the passage, a constriction is provided having an opening defining a venturi of fixed throat size to guide the gas passing into the vessel upwards into the fluidized bed. A stream of high velocity gas is directed through the venturi or passage into the reaction vessel, causing ash particles to agglomerate in the bottom portion of the vessel and eventually discharge downwardly through the passage and venturi throat.

In Jequier et al, at column 3, lines 7–10, it is taught that "[i]t is desirable that the gasification agents should have a speed perpendicular to the smallest section of the venturi and at this point they should not have any helicoidal movement." It has been discovered that a direct upward passage of fluid through the venturi does not provide the most efficient rate of solid discharge through the venturi. Improved solids discharge or removal can be obtained through provision of ridges or other devices to permit the descent of agglomerated ash.

In Schora et al, U.S. Pat. No. 4,023,280 and Patel et al, U.S. Pat. No. 4,057,402, the environment in which the claimed invention could operate as well as some of the problems associated with a classifier for a fluidized bed ash agglomerating gasifier are also described. With respect to Schora et al, an apparatus and method for varying the cross-sectional area of the venturi input in the fluidized bed retained within a vessel are disclosed. With respect to Patel et al, a process for gasifying carbonaceous feed materials is disclosed. Both patents utilize a venturi which has a smooth internal surface which provides for a combination of agglomerate release but at undesirably low agglomerate flow rates and evidencing incomplete separation of ash from unreacted hydrocarbonaceous material, such as char.

Keyser, U.S. Pat. No. 3,636,983, Willis, U.S. Pat. No. 3,693,329 and Galliot, U.S. Pat. No. 2,017,043, describe fluid flow arrangements in hollow pipes in which a spiral angular velocity is imparted to the fluid by the use of ridges disposed within a pipe. None of the Keyser, Willis or Galliot patents contemplates the passage and agglomeration of particulate matter, such as agglomerated ash, falling by force of gravity countercurrent to a high temperature gas flow, nor the problems associated with ash agglomeration as encountered by applicant.

A problem associated with the apparatus as illustrated in Jequier et al is that extremely high temperatures are present in the defined conical withdrawal section. In addition, since the abrasive agglomerated ash particles are in constant physical contact with the walls of the cone and because of the high temperatures present therein, expensive alloys are required to manufacture a long lasting withdrawal cone. More importantly, since the gas stream that surrounds the ash agglomerates is the same as the stream separating or classifying the agglomerates from the fluidized bed, unusual restrictions are imposed on the rate and composition of gas flow. In addition to undesirable sintering taking place in the venturi, the nozzle can plug, particularly when fine coal material, as recovered from product gases, is recycled back to the fluidized bed through the venturi nozzle. Because the plugging occurs in a confined zone of high temperature, a fused adherent mass, if it forms, can lead to an undesired premature reactor shutdown. Problems such as these have created a need for modification in the classification apparatus.

The use of any interior ridges, spiral or otherwise, in a fluidized bed gasifier venturi to facilitate ash agglomeration and selective solids withdrawal has not been disclosed in any of the prior art. The smooth bore venturi orifices used in the past have relatively low rates of solid discharge from fluidized bed gasifiers and incomplete separation and classification of ash from unreacted solid hydrocarbonaceous material, such as char. It is with this background that the present invention was developed.

SUMMARY OF THE INVENTION

It is an object of the present invention to provide an improved apparatus for withdrawing agglomerated solids from a fluidized bed of particulate hydrocarbonaceous material.

Another object of the present invention is to provide an improved apparatus for withdrawing reaction products, which are more dense than the reactants, from a fluidized bed of solid hydrocarbonaceous particles.

A further object of the present invention is to provide an apparatus for increasing the rate of discharge of agglomerated solid material and better controlling the discharge thereof.

Still another object of the present invention is to provide an apparatus for improving the separation of agglomerated solids, such as ash, from the unreacted solid hydrocarbonaceous material, such as coal char in a venturi device.

It is yet another object of the present invention to provide an apparatus for improving the method of contacting solids and gases in a reactor, such as a fluidized bed gasifier for classification of the solid materials.

It is a further object of the present invention to provide an apparatus for permitting the selective return of solids to the fluidized bed or similar reactor while, at the same time, permitting efficient withdrawal of solids.

The present invention relates to an improved apparatus for withdrawing agglomerated solids from a fluidized bed of particulate hydrocarbonaceous material. At least one spiral ridge which may have a beveled edge and a tapered configuration is positioned on the interior surface of the constricted cylindrical opening of the venturi to permit efficient withdrawal of the agglomerated solids.

The improved apparatus of the present invention may further incorporate a tube which is centrally disposed in the constricted cylindrical opening and has reactive gases passing through it upwardly towards the fluidized bed. The spiral ridge may either contact the tube in the top end of the constricted cylindrical opening or may contact the tube along its entire length.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a schematic diagram of a typical fluidized bed gasifier incorporating an ash agglomerating device;

FIG. 2 is a schematic diagram of a typical fluidized bed gasifier incorporating the improved venturi of the present invention with one spiral ridge positioned on the interior surface of the constricted cylindrical opening of the venturi;

FIG. 3 is a schematic diagram of the improved venturi of the present invention with one spiral ridge positioned on the interior surface of the constricted cylindrical opening of the venturi;

DETAILED DESCRIPTION OF THE PREFERRED EMBODIMENT

Figure 4:
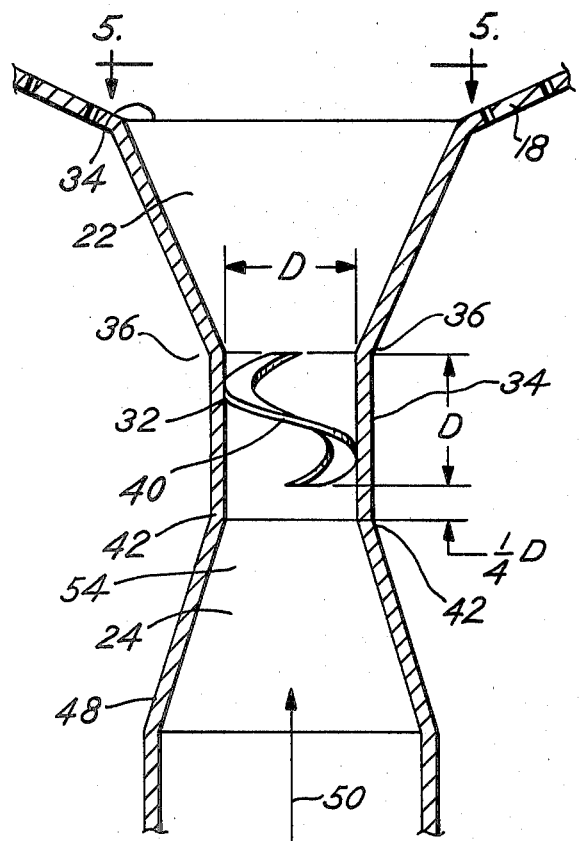
FIG. 4 is a partial cross-sectional view of FIG. 2 showing the improved venturi of the present invention with one spiral ridge positioned on the interior surface of the constricted cylindrical opening of the venturi.
Figure 13:
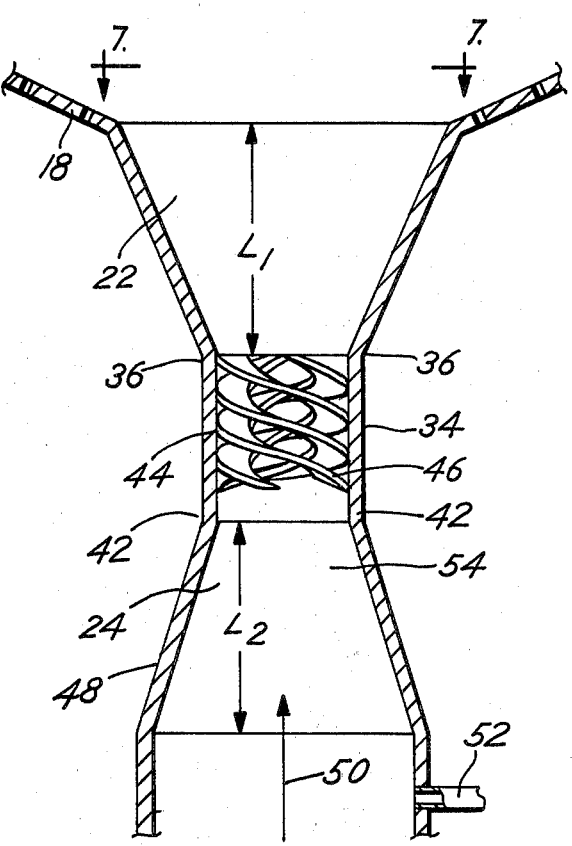
FIG. 13 is a cross-sectional view of a preferred improved venturi in accordance with the present invention.
Figure 5:
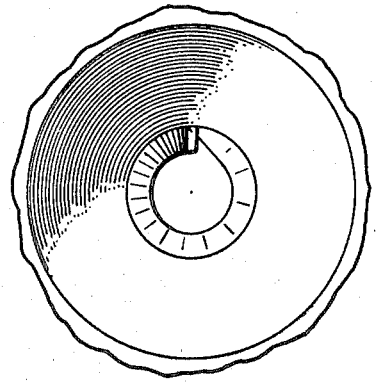
FIG. 5 is a partial cross-sectional view of FIG. 3 showing one spiral ridge positioned on the interior surface of the constricted cylindrical opening of the venturi.
Figure 14:
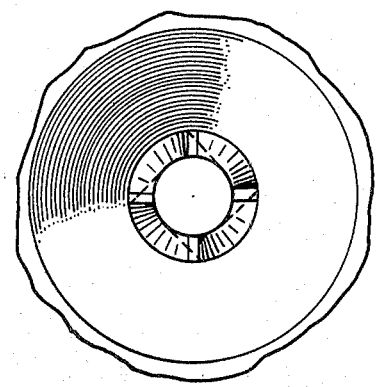
FIG. 14 is a cross-sectional view of four spiral ridges positioned on the interior surface of the constricted cylindrical opening of the venturi.

FIG. 1 is a schematic drawing of a prior art fluidized bed gasifying apparatus or device which includes conventional means for agglomerating ash or particulate matter in the fluidized bed as generally described in Jequier et al., U.S. Pat. No. 2,906,608, previously referenced. Briefly, the device includes an upright vessel 10 within which a fluidized bed 12 of coal char is retained at conventional temperature and pressures for the conversion of the coal to gaseous products. Specifically, pulverized fresh feed coal enters via line 14 and is contained within the bottom portion of the vessel or reactor 10 as a fluid bed 12. The coal within the bed 12 is then converted by reaction with steam and air or oxygen to gaseous fuel components. These gaseous fuel components pass from the vessel 10 through a discharge line 16.

A shaped sloped grid 18 is provided within the vessel 10 at the bottom of the bed 12. Air or oxygen and steam enter through a line 20 and pass through openings in the grid 18 to assist in maintenance of the bed 12 in a fluidized state. The ash contained in the feed coal within the bed 12 generally settles near the bottom of the fluid bed 12 due to its greater density. Thus, the ash particles flow down the sides of the generally conical grid 18 and pass into or enter a withdrawal chamber or passage 22 which is formed as part of the grid 18.

The ash particles are contacted within passage 22 by a high velocity air/steam or oxygen/steam stream. The stream enters the chamber or passage by passing from line 28 and through the narrow throat or orifice 26 of the passage or venturi tube 24. The air or oxygen and steam stream entering the throat 26 via an inlet line 28 reacts with coal particles that enter the region of the passage 22.

The localized higher temperatures in the region of passage 22 cause the ash particles within the passage 22 to become sticky. As a consequence, the ash particles, as they strike each other, gradually agglomerate. When they reach a sufficient size and weight, the velocity of air or oxygen and steam stream entering through the venturi 24 is insufficient to keep the agglomerated particles in a fluidized or suspended state. As a result, they pass downwardly through the venturi 24 into the withdrawal line 30.

The velocity of the inlet gases through the venturi throat 24 is high compared to the gas velocity at distribution grid 18. This high velocity stream, as mentioned previously, forms a jet or a spout giving rise to a violent and rapid circulation of solids in the zone of the passage 22. The gases passing through the venturi 24 also contain a higher percentage of the oxidant than those gases passing through the distribution grid 18. Thereby, as previously explained, a higher temperature is generated in the zone of passage 22 and in the middle, but not entirely through the fluidized bed 12.

FIGS. 2-5, and 13-14 illustrate the apparatus for withdrawing agglomerated solids as found in my copending application, Ser. No. 288,158, filed on July 29, 1981, the teachings of which are incorporated herein by reference.

Figure 6:
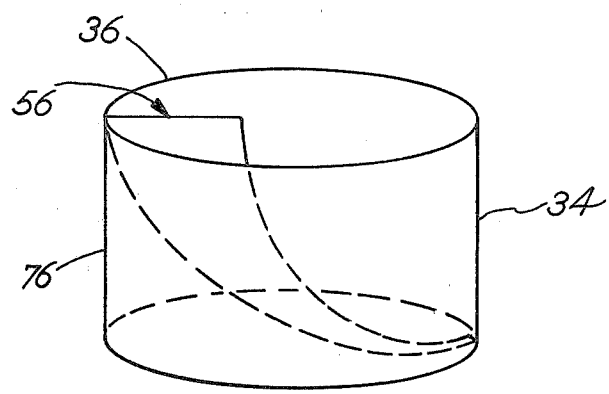
FIG. 6 is a schematic diagram of the improved venturi of the present invention with one spiral ridge positioned on the interior surface of the constricted cylindrical opening of the venturi being wider at the top end of the constricted cylindrical opening than at the bottom.
Figure 10:
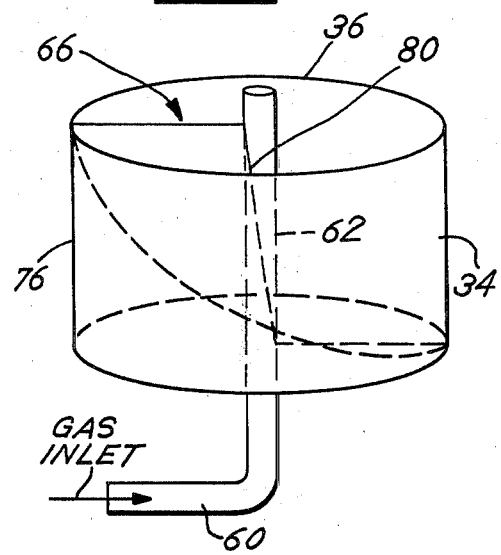
FIG. 10 is a schematic diagram of the improved venturi of FIG. 9 with one spiral ridge contacting the central tube over the length of the central tube disposed within the constricted cylindrical opening of the venturi.
Figure 11:
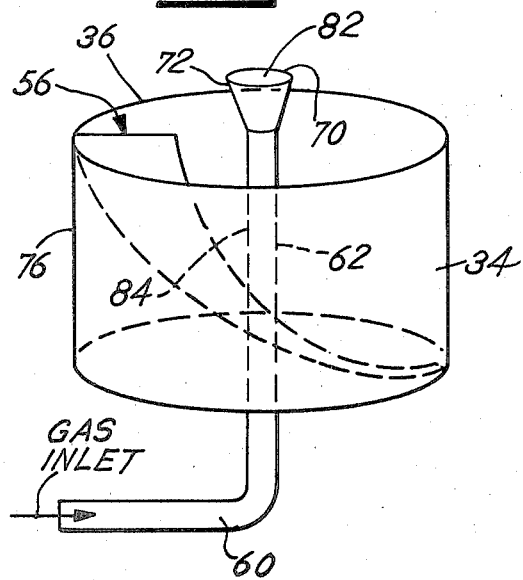
FIG. 11 is a schematic diagram of the improved venturi of FIG. 8 with the central tube having a flared opening extending above the constricted cylindrical opening of the venturi.
Figure 12:
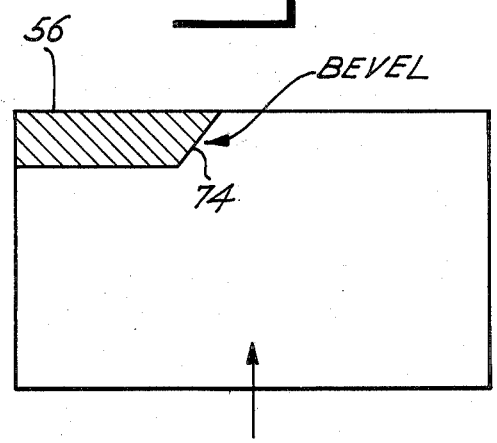
FIG. 12 is a cross-sectional view of the spiral ridge of the present invention having a beveled edge to maintain reentrainment of char particles.

FIGS. 6-12 illustrate the improved venturi apparatus of the present invention. A centrifugal force is exerted upon ash particles descending through the constricted opening 34 such that the particles will move to the outside wall 76 of the constricted opening 34. Collisions with reacted char will permit the less dense char to be more readily deflected to the center of the constricted opening 34 and swept back into the fluidized bed 12 by the rising gas stream 50. In order to increase the amount of ash agglomerate material discharged per unit time, as illustrated in FIG. 6, the width of spiral ridge 56 can be made widest at the top end 36 of the constricted opening 34. The width of spiral ridge 56 decreases as the ridge 56 descends through the constricted opening 34. The velocity of gas stream 50 rising to the fluidized bed 12 will effectively increase due to the decrease in cross-sectional area of the spiral ridge 56. The increase in gas velocity augments the return of char to the fluidized bed 12. The internal edge 74 of spiral ridge 56 can be beveled, as illustrated in FIG. 12, to maintain reentrainment of char particles.

Figure 7:
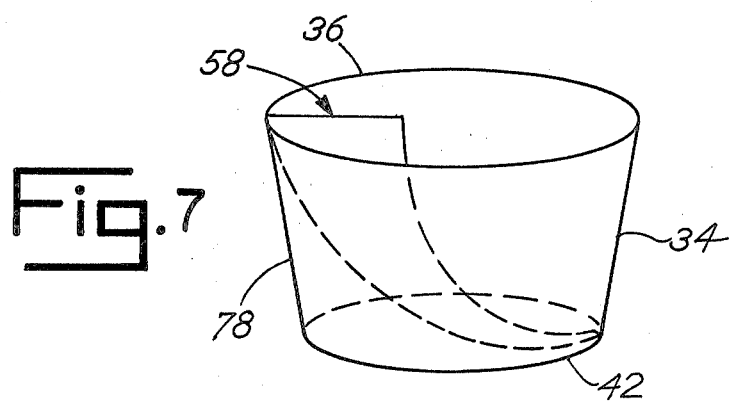
FIG. 7 is a schematic diagram of an improved venturi of the present invention with the spiral ridge of FIG. 6 positioned on the interior surface of a sloped constricted opening of the venturi.

The discharge rate of solid ash agglomerates may also be increased by sloping the wall 78 of constricted opening 34 to provide a larger diameter at the top end 36 of the constricted opening 86 than at the bottom end 42, as illustrated in FIG. 7. Spiral ridge 60 has a width at the top end 36 greater than that of spiral ridge 56 to provide a wider initial exit for material from the fluidized bed 12 than that of constricted opening 34 having a vertical wall 76.

Figure 8:
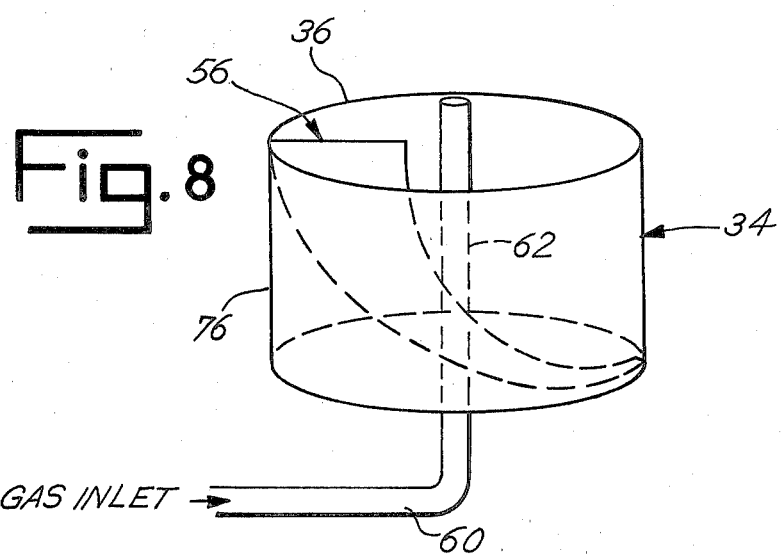
FIG. 8 is a schematic diagram of the improved venturi of FIG. 6 with a central tube containing reactive gases disposed within the constricted cylindrical opening of the venturi.

In one method of operation of the reactor 10, a central tube 62, containing reactive gases, entering central tube 62 via inlet 60, may be centrally disposed in the constricted opening 34, as illustrated in FIG. 8. The reactive gases rise through central tube 62 to permit gasification in the fluidized bed 12. When reactive gas is introduced through central tube 62, the velocity of gas stream 50 may be reduced to augment the rate of agglomerate discharge from the fluidized bed 12.

Figure 9:
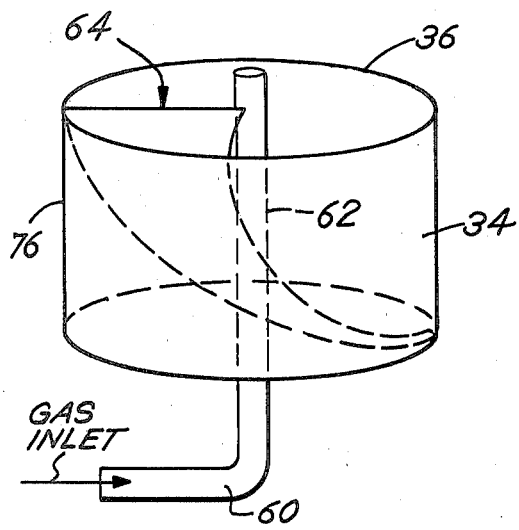
FIG. 9 is a schematic diagram of the preferred embodiment of the present invention showing the improved venturi of FIG. 8 with one spiral ridge contacting the central tube disposed within the constricted cylindrical opening of the venturi.

The spiral ridge 56 may be placed so that it does not contact central tube 62 and permits a clear space for gas stream 50 to rise between the wall 76 of constricted opening 34 and central tube 62. Alternatively, in a preferred embodiment of the present invention, a spiral ridge 64 can extend toward central tube 62 to provide a contact with the central tube 62 at the top end 36 of the constricted opening 34, as illustrated in FIG. 9. In this manner, a larger portion of the rising gas stream 50 surrounding central tube 62 flows along the spiral ridge 64 than flows through the space between wall 76 of constricted opening 34 and central tube 62. At the top end 36 of constricted opening 34, gases are constrained in a spiral path, due to the contact of spiral ridge 64 with the central tube 62. This spiral or helical motion increases the classification effect of the gases in gas stream 50 on the mixture of agglomerates and unreacted char.

A spiral ridge 66 may also be built around the central tube 62 to maximize the agglomerate discharge rate by permitting contact of an inner edge 80 of the spiral ridge 66 with the central tube 62 along the length of spiral ridge 66, as illustrated in FIG. 10. In this case, the classification is provided by the gas rising along the spiral path formed by the spiral ridge 66, the wall 76 of constricted opening 34 and the central tube 62.

The agglomerate discharge rate is affected by the rate of circulation of solids within the fluidized bed 12. The central tube 62 may have an upper end 70 which can be positioned above the constricted opening 34. This positioning will permit an increased circulation of solids to the spiral ridge 56. Alternatively, the upper end 70 of the central tube 62 may have a flared portion 72 which reduces the gas velocity exiting the central tube 62 according to the ratio of the squares of the diameter at the top 82 of the flared portion 72 and the portion 84 of central tube 62 leading to the flared portion 72. This configuration is illustrated in FIG. 11. The angle of the flared portion 72 may be adjusted to give a desirable range of circulation rates to aid in controlling discharge rates and agglomerate growth. The growth of agglomerates is promoted by maximizing recirculation through withdrawal passage 22 above the central tube 62. Elevation of the top 82 of the central tube 62 above the constricted opening 34 limits circulation through passage 22 and provides a more stagnant zone 54 below central tube 62, thereby readily permitting discharge.

It should be understood that the foregoing disclosure emphasizes certain specific embodiments of the invention and that all modifications or alternatives equivalent thereto are within the spirit or scope of the invention as set forth in the appended claims.

I claim as my invention:

1. An apparatus including a fluidized bed reactor with means for fluidizing hydrocarbonaceous particles therewithin and with means for withdrawing agglomerated solids from the fluidized bed of solid hydrocarbonaceous particles, comprising, in combination:
   (a) a venturi connected to the bottom of the fluidized bed reactor for receiving agglomerated solids, said venturi having a top end and a bottom end and a constricted opening therebetween, said constricted opening having an upper end and a lower end;
   (b) at least one spiral ridge positioned on the interior surface of said constricted opening, said spiral ridge being of a greater width at said upper end of said constricted opening than at said lower end of said constricted opening; and
   (c) means for passing a gas stream upwardly into the bottom of the fluidized bed through the venturi.

2. The improved apparatus of claim 1 wherein said spiral ridge has an edge, said edge being beveled.

3. The improved apparatus of claim 1 wherein said interior surface of said constricted opening is sloped, said constricted opening thereby having a greater diameter at said upper end of said constricted opening than at said lower end of said constricted opening.

4. An apparatus including a fluidized bed reactor with means for fluidizing hydrocarbonaceous particles therewithin and with means for withdrawing agglomerated solids from the fluidized bed of solid hydrocarbonaceous particles, comprising, in combination:
   (a) a venturi connected to the bottom of the fluidized bed reactor for receiving agglomerated solids, said venturi having a top end and a bottom end and a constricted opening therebetween, said constricted opening having an upper end and a lower end;
   (b) at least one spiral ridge positioned on the interior surface of said constricted opening, said spiral ridge being of a greater width at said upper end of said constricted opening than at said lower end of said constricted opening, said spiral ridge having an edge, said edge being beveled thereby facilitating withdrawal of said agglomerated solids, and (c) a tube centrally disposed within said constricted opening, said tube having reaction gases passing therethrough; and (d) means for passing a gas stream upwardly into the bottom of the fluidized bed reactor through the venturi on the outside of the tube.

5. The improved apparatus of claim 4 wherein said spiral ridge contacts said tube in a lower portion of said tube, said lower portion of said tube disposed in said upper end of said constricted opening.

6. The improved apparatus of claim 4 wherein said spiral ridge has an inner edge, said inner edge contacting said tube over the length of said tube.

7. The improved apparatus of claim 4 wherein said tube has an upper portion, said upper portion extending above said upper end of said constricted opening.

8. The improved apparatus of claim 7 wherein said upper portion of said tube is flared thereby reducing the velocity of said gases exiting said tube.

* * * * *